(12) United States Patent
Wolthers et al.

(10) Patent No.: US 7,913,882 B2
(45) Date of Patent: Mar. 29, 2011

(54) PRESSURE CONTROL DEVICE FOR A CONTAINER

(75) Inventors: Wolter Wolthers, Leiden (NL);
Johannes Jacobus Thomas Vlooswijk, Papekop (NL)

(73) Assignee: Heineken Supply Chain B.V., Amsterdam (NL)

( * ) Notice: Subject to any disclaimer, the term of this patent is extended or adjusted under 35 U.S.C. 154(b) by 313 days.

(21) Appl. No.: 11/813,668

(22) PCT Filed: Jan. 11, 2006

(86) PCT No.: PCT/NL2006/000013
§ 371 (c)(1),
(2), (4) Date: Jul. 10, 2007

(87) PCT Pub. No.: WO2006/091069
PCT Pub. Date: Aug. 31, 2006

(65) Prior Publication Data
US 2009/0127292 A1    May 21, 2009

(30) Foreign Application Priority Data
Jan. 11, 2005   (NL) ..................................... 1027998

(51) Int. Cl.
*B65D 83/00* (2006.01)
(52) U.S. Cl. ..................... 222/396; 222/129.1; 222/389; 222/394; 222/399
(58) Field of Classification Search .................. 222/396, 222/399, 129.1, 1, 402.1, 135, 389, 394; 137/571, 906; 239/373, 308, 303
See application file for complete search history.

(56) References Cited

U.S. PATENT DOCUMENTS

| 5,110,014 | A | * | 5/1992 | Doundoulakis | 222/396 |
| 5,120,585 | A | * | 6/1992 | Sutter et al. | 428/34.2 |
| 5,234,140 | A | * | 8/1993 | Demarest et al. | 222/394 |
| 5,285,931 | A | * | 2/1994 | Alfons | 222/61 |
| 5,368,207 | A | | 11/1994 | Cruysberghs | |
| 5,439,137 | A | * | 8/1995 | Grollier et al. | 222/1 |
| 6,360,923 | B1 | | 3/2002 | Vlooswijk | |
| 6,412,668 | B1 | | 7/2002 | Vlooswijk et al. | |
| 6,451,423 | B1 | * | 9/2002 | Armat et al. | 428/330 |
| 6,745,922 | B1 | * | 6/2004 | Vlooswijk et al. | 222/399 |
| 7,185,786 | B2 | * | 3/2007 | Krause et al. | 222/1 |
| 7,467,733 | B2 | * | 12/2008 | van't Hoff | 222/389 |
| 2004/0076722 | A1 | * | 4/2004 | Archibald et al. | 426/128 |
| 2004/0241290 | A1 | * | 12/2004 | El-Afandi | 426/108 |

FOREIGN PATENT DOCUMENTS

| FR | 2690142 A1 | 10/1993 |
| JP | 06339512 A * | 12/1994 |
| WO | WO 9416663 A1 * | 8/1994 |
| WO | WO 9947451 A1 | 11/1999 |
| WO | WO 0035773 A1 | 6/2000 |
| WO | WO 0035774 A1 | 6/2000 |
| WO | WO 0035777 A1 | 6/2000 |

* cited by examiner

*Primary Examiner* — Frederick C. Nicolas
(74) *Attorney, Agent, or Firm* — Pearne & Gordon LLP

(57) ABSTRACT

A pressure control device (8) for medium-containing containers (2) such as liquid or gas containers, which pressure control device comprises a pressure control chamber (25) with at least one movable wall part (22) for operating a mechanism for opening and/or closing a gas supply opening (27) of a gas holder, while a scavenger (31) is accommodated in the pressure control chamber. Preferably, the pressure control device is stored at atmospheric conditions before the beverage and the pressure control device are brought into contact.

16 Claims, 3 Drawing Sheets

PRESSURE CONTROL DEVICE FOR A CONTAINER

Figure 1:
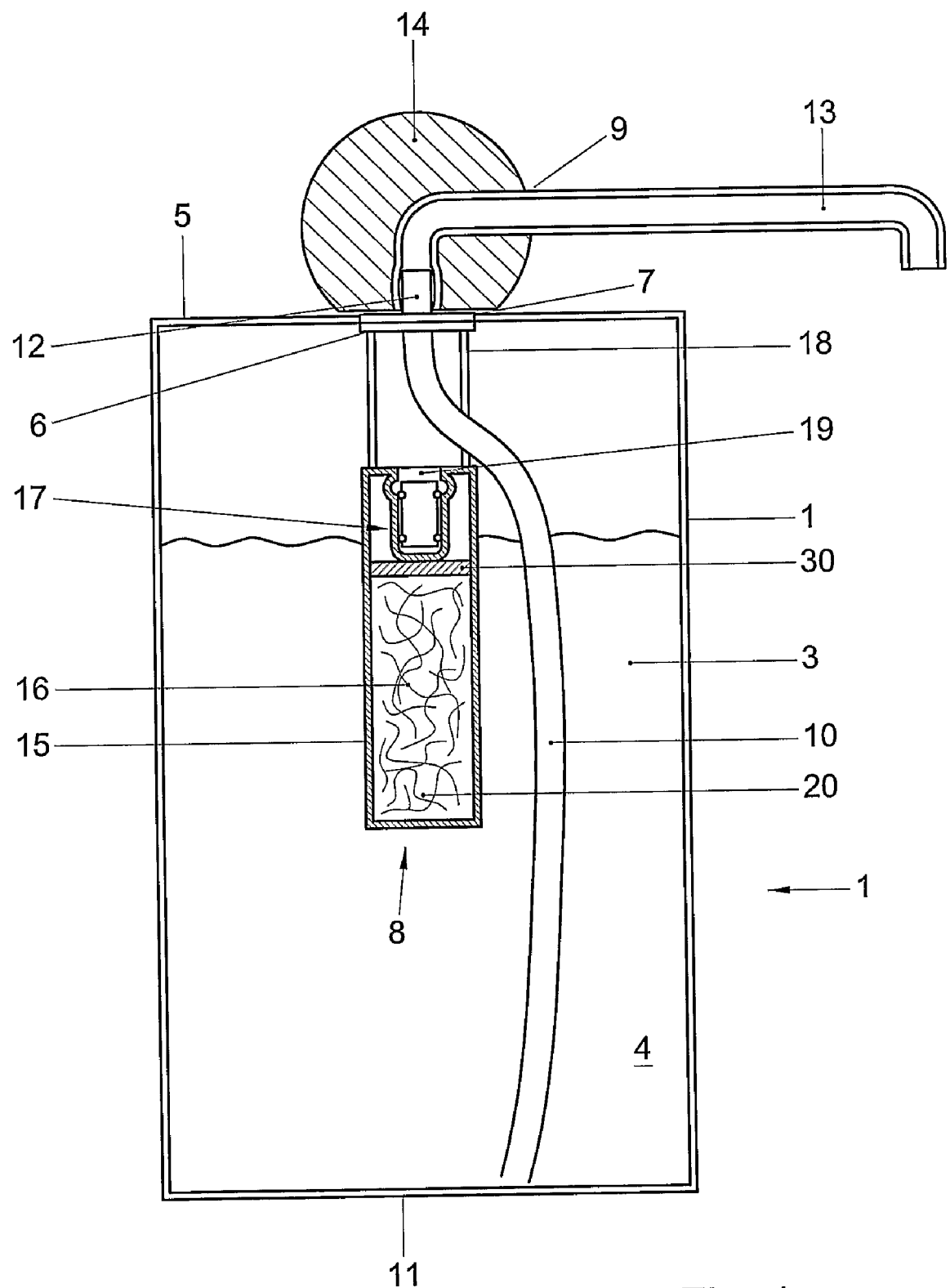

The invention relates to a pressure control device for controlling the pressure in a storage compartment of a container.

Products that are to be dispensed in pressurized condition from a container, will be pressurized in the container with the aid of, for instance, a pressure medium such as a pressure gas. To that end, a pressure medium may have been provided in the container at a relatively high excess pressure, in the same compartment in which the product to be dispensed is included. This pressure medium, typically a pressure gas, will for example accumulate in a headspace above the product to be dispensed. At the start of the use of such a container, a high dispensing pressure will prevail but this pressure will decrease as more and more product is dispensed from the container. The fact is that a part of the pressure medium will leave the container together with the product and, moreover, the space occupied by this decreasing amount of pressure medium will, conversely, become increasingly greater.

In order to obviate this drawback, it has already been suggested to provide a compartment in or on the container in which compartment an amount of pressure medium is stored at a relatively high pressure, from which, with the aid of a pressure control device, pressure medium can be dispensed in a dosed manner. Such devices are known from, for example, WO 99/47451

In such a known device, a pressure control device is provided which contains a pressure control chamber with at least one movable wall part. The pressure control chamber is sealed off with respect to the surroundings and in the pressure control chamber a control pressure is provided, for instance in that the chamber is filled with a pressure control gas such as air. The movable wall part operates a valve mechanism such that if in the space in which the beverage is located a pressure change occurs in relation to the control pressure in the pressure control chamber, in particular a reduction of pressure resulting from beverage being dispensed, the movable wall part will change position and a valve mechanism will temporarily open. As a result, pressurised gas flows from said compartment into the space holding the beverage. If the pressure in this space has, once again, the desired value, approximately equal to the control pressure, the movable wall part is pressed back into the initial position and the valve mechanism is closed.

With this known assembly, the drawback occurs that the gas can migrate from the surroundings into the pressure control chamber or vice versa, so that undesired changes in the composition of the gas in the pressure control chamber and undesired changes in volume therein can occur. As a result, a different equilibrium situation will arise. The fact is that an increase of the amount of gas and/or a change in the compressibility thereof in the pressure control chamber will effect a change in the control pressure so that the pressure in the space in which the beverage is located will obtain a different equilibrium. This can be disadvantageous to the beverage both to its quality and to the dispensing thereof, in particular with gas-containing beverages such as carbonated beverages.

The same or comparable drawbacks will, for that matter, occur when such a device is utilized for, for example, other liquids, pasty masses or gases and when using a liquid in the pressure control chamber.

The object of the invention is to provide a pressure control device for medium containing containers wherein at least a number of the drawbacks of the known devices are avoided, while maintaining the advantages thereof.

It is in particular the object of the invention to provide such a pressure control device with which the same control pressure can be maintained for a longer period of time.

A further object of the invention is to provide a pressure control device which can be stored under atmospheric conditions for some time and, when subsequently used, has or will each time have the pre-selected control pressure in the pressure control chamber due to use.

At least a number of these and other objects are achieved with a pressure control device according to the invention.

With a pressure control device according to the invention, in the pressure control chamber a scavenger is included for capturing gas that migrates, during use, in the pressure control chamber. As a result, during use, no change in the composition of the gas and/or the volume of the gas will occur caused by the gas migrating into the pressure control chamber, so that the control pressure is maintained.

As a scavenger, preferably, a scavenger is used which is suitable for binding gas used as a pressure gas in a beverage dispensing device. For instance, in case of carbonated beverages, as a rule, a scavenger will be used which is suitable for capturing carbon dioxide.

With a pressure control device according to the invention, any suitable type of scavenger can be used, such as chemically binding, adsorbing and/or absorbing scavengers. Preferably, the scavenger is included in the pressure control chamber, separated from the medium to be dispensed, in particular beverage. Thus, contamination is excluded. The scavenger may be inserted into the pressure control chamber as a loose item, or be confined in a packaging thereof. The scavenger can also form an integral part of the device, for instance fixedly connected to a wall part.

A scavenger for use in a pressure control device according to the invention is preferably selected from the collection of $CO_2$ absorbing and/or absorbing agents, for instance carbon, in particular activated carbon, diatomaceous earth (kieselguhr) alumino silicates, zeolites or silicates. Also, in principle, liquids and solutions can be used, in particular basic substances.

The invention further relates to a container, characterized by the features of claim 7.

Such a container is particularly suitable for storing and dispensing medium such as beverage at a controlled pressure.

In a particularly advantageous embodiment, a container according to the invention is designed for dispensing carbonated beverage, while carbon dioxide is used as a pressure gas, preferably carbon dioxide with a purity accepted according to FDA standards, which, during use, is introduced directly into the beverage while in the pressure control chamber of the pressure control device a $CO_2$ scavenger is included.

The invention further relates to a method for preparing a beverage container, characterized by the features of claim 11.

Such a method offers of the advantage that the beverage container and the pressure control device can be manufactured, transported and stored separately without pressure changes occurring, while during use the pressure will always be controlled within desired boundaries. It is preferred that then, the pressure is controlled such that an equilibrium is formed between the medium to be dispensed and the head space in the container.

The invention further relates to a method for manufacturing a pressure control device, characterized by the features of claim 12.

In the subclaims, further advantageous embodiments of the invention are given.

Figure 2:
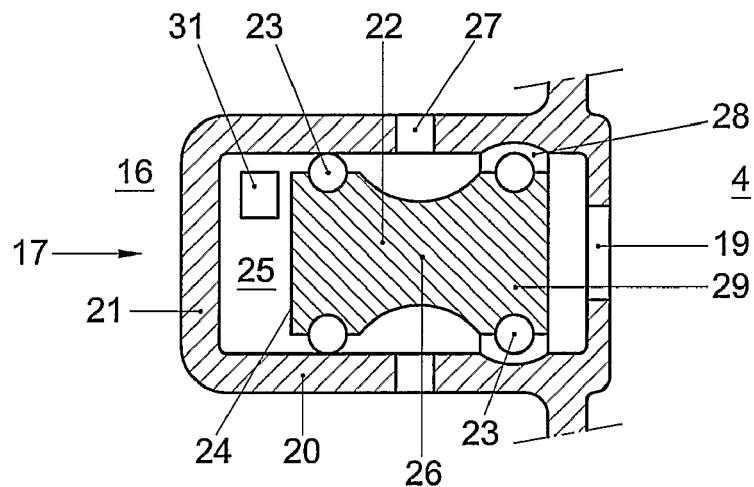
Figure 3:
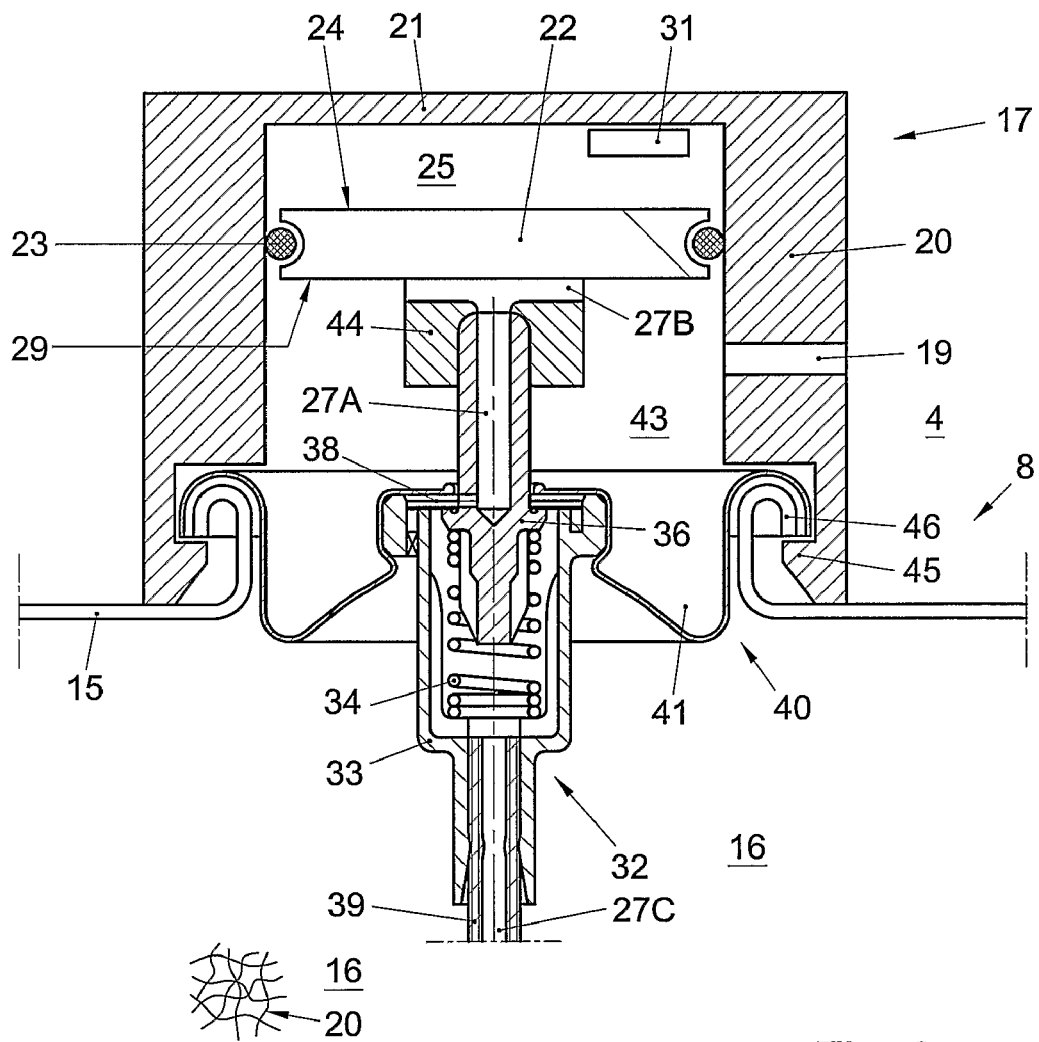
Figure 4:
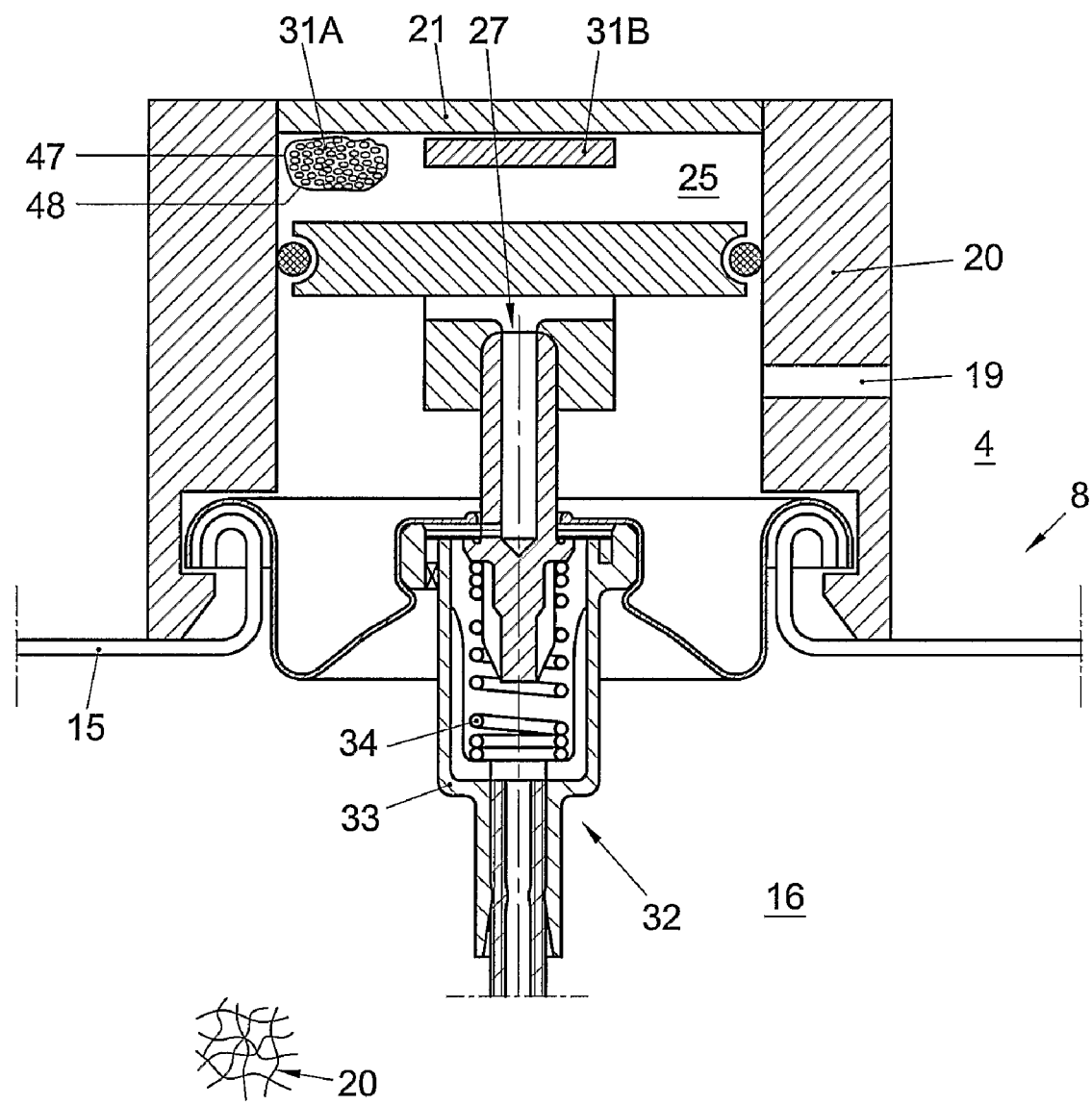

In clarification of the invention, exemplary embodiments thereof will be described with reference to the drawing. In the drawing:

FIG. 1 schematically shows in cross-sectional side view, a device according to the invention;

FIG. 2 schematically shows, in cross-sectional view, a pressure control means for use in a device according to the invention;

FIG. 3 schematically shows an alternative embodiment of a pressure control means according to the invention; and FIG. 4 schematically shows a second alternative embodiment of a pressure control means according to the invention, with various types of scavengers.

In this description, identical or corresponding parts have corresponding reference numerals. In this description, the embodiments will be elucidated with reference to a tapping device for carbonated beverages, in particular beer. It will, however, be directly clear that other applications are also possible, for instance use of such a device for dispensing foodstuffs, foamed products, pastas and the like.

FIG. 1 shows a device 1 according to the invention, provided with a container 2 in which an amount of beer 3 to be dispensed is included in a first compartment 4. In the embodiment shown, the container 2 is a relatively thin-walled can with a relatively large content, for instance 3 or 5 liter. The container 2 is closed all round and has its top face provided with a central opening 6 accommodating dispensing means 7, which will be further described hereinbelow. Extending under the dispensing means 7 is a pressure control device 8, which will also be further described hereinbelow. Connecting to the dispensing means 7 are diverting means 9 for discharging beer 3 from the container 2, via the dispensing means 7 to, for instance, a glass (not shown). To that end, a dip tube 10 extends from the dispensing means 7 to a position adjacent the bottom 11 of the container 2, so that the complete volume of beer 3 can be dispensed via the dispensing means 7 and the diverting means 9.

The dispensing means 7 comprise a passage 12 to which, within the container 2, to dip tube 10 connects and to which, outside the container 2, the diverting means 9 connect. The dispensing means 7 further comprise a seal (not shown) which can be opened against a spring pressure and which, in a first position, seals the dispensing means 7, and, in a second position, brings the dip tube 10 in fluid communication with the diverting means 9, at least a duct 13 extending therein. For operating the dispensing means 7, a knob 14 is provided which, upon movement in the direction of the top surface 5, moves the sealing means to the second position by said spring pressure while it is moved in the direction of the first position for sealing the device when not actuated. Such dispensing means 7 are known per se and can be adapted or replaced in a known suitable manner by a skilled person, within the framework of the invention.

The pressure control device 8 comprises a housing 15 which comprises a second compartment 16. Provided adjacent the top end of the housing 15 are pressure control means 7 which will be described further. By suspension means 18, the housing 15 is suspended from the top face 5 or the dispensing means 7 such that a passage opening 19 of the pressure means 10 is positioned at some distance below the dispensing means 7, preferably above the liquid level. The pressure control device 8 and the dispensing means 7 are preferably interconnected in such a manner that they can be inserted through the central opening 6 into the top face 5, with the opening 6 being closed by the dispensing means 7 so as to be gas-tight and liquid-tight. Thus, the pressure control device 8 can readily be placed while it can moreover also be readily removed, at least in a workplace arranged therefor, for re-use or recycling.

It is preferred that in the second compartment 16, a filler 20 is provided, suitable for associating a relatively large amount of propellant. In the embodiment shown, the filler 20 is designed as an amount of activated carbon fibers having a relatively large specific internal and external surface area, for adsorbing and/or absorbing thereon or therein a relatively large amount of $CO_2$ at an acceptable gas pressure within the second compartment 16.

In an advantageous embodiment, an activated carbon, in particular activated carbon fiber with a large specific surface area, preferably between 600 and 1400 $m^2/gr$ and a high internal porosity, in particular more than 55% and preferably between 55 and 80% is used as a filler. Moreover, the fibers preferably have a large external specific surface, for instance more than 2 $dm^3$, more in particular more than 25 $dm^3$. Such activated carbon fibers are commercially available. The use of such filler offers the advantage that the second compartment can be of relatively small design, while sufficient $CO_2$ can yet be associated. By way of illustration, for the complete emptying of a container with a content of 5 l beer, at 7° C. and a desired internal pressure of 1.7 bar, a second compartment having a content of approximately 40 ml may suffice, at a gas pressure in the second compartment of about 10 bar. In the embodiment shown, a slightly larger second compartment and the same pressure have been opted for (hence a larger amount of propellant), to obtain a safety margin, so that the container is prevented from being emptied completely. The ratio between the content of the first compartment and the content of the second compartment can for instance be chosen to be >140:1, for instance 66:1. In view of the desired outside dimensions of the device in relation to the content, it is preferred that this ratio is greater than 5:1, more preferably greater than 15:1 and most preferably greater than 50:1. For the complete emptying of an above-described container with a content of about 5 l, approximately 18 l of $CO_2$ gas is available, measured at a pressure of 1 bar. It will be directly understood that for any content of a first compartment and desired excess pressure to be obtained therein, the desired volumes of $CO_2$ and filler can readily be determined, as well as the desired content of the second compartment, related to pressure and temperature. If said filler is omitted either a compartment is to be used in which the pressure gas can be stored at higher pressure or a larger compartment. Further, it will be clear that also other fillers can be used, depending on, inter alia, the application opted for, in particular the propellant to be employed. For instance acid-treated clay, activated aluminum and bauxite, iron oxide, magnesium oxide, silica gel as well as suitable liquids such as acetone and the like can be used. When applied to beverages, in particular carbonated beverages and other products suitable for consumption, the use of $CO_2$ offers the advantage that, with normal use, this does not have any adverse effect upon the user. Moreover, $CO_2$ can be obtained relatively easily, for instance as waste product in industrial processes, which reuse is environmentally advantageous.

The pressure control device 8 is for instance provided with pressure control means 17 which are depicted in more detail in FIG. 2 and are known per se from, inter alia, U.S. Pat. No. 5,368,207, which publication, with respect to these pressure control means, is understood to be incorporated herein by reference. Such pressure control means, also known by the name of Pressure Generator, are furnished by, inter alia, the company Stabilpress, Belgium. The pressure control means 17 comprise a cylindrical casing 20, which is closed at a first end by a bottom 21 and provided at its opposite end with a passage opening 19. During use, the passage 19 faces the first compartment 4 and is in open fluid communication therewith. Accommodated in the casing 20 is a somewhat hourglass-shaped piston body 22 provided at either end with an O-ring or a like seal 23 abutting against the inside of the casing 20. Between the first end 24 of the piston body 22 and the bottom 21 a first chamber 25 is formed, whose size varies according to the axial displacement of the piston body 22 within the casing 20. At the position of the waist 26 of the piston body 22, a number of openings 27 are provided in the casing 20, which are in fluid communication with the second compartment 16. A circular groove 28 is included between the openings 27 and the passage 19, on the inside of the casing 20, such that when the O-ring fitted adjacent the second end 29 extends at the level of the groove 28, a slightly limited fluid connection is formed between the second compartment 16, via the openings 27, the space between the O-ring 23 and the groove 28 and the passage 19 to the first compartment 4. Gas of a relatively high pressure can then flow from the second compartment 16 via this fluid communication into the first compartment 4 whereby the pressure in the first compartment 4 increases. In the chamber 25, a reference pressure is provided which approximately corresponds to the desired pressure in the first compartment 4. If necessary, spring means or the like can be accommodated in the first chamber to effect said reference pressure. If the desired pressure in the first compartment has been realized, the piston body 22 is axially displaced in the direction of the bottom 21 such that the reference pressure in the chamber 25 is realized, in which position the O-ring 23 adjacent the second end 29 seals the above-described fluid passage, since the O-ring 23 then abuts against the inside of the casing 20 between the openings 27 and the groove 28. If a portion of the beer will be displaced from the first compartment 4 with the aid of the dispensing means 7, the pressure therein will decrease, as a result of which the piston body 22 will, under the influence of the pressure in the chamber 25, be axially displaced in the direction of the passage 19, such that gas can again flow at high pressure from the second compartment 16 along the above-described fluid connection into the first compartment, for restoring the desired pressure therein. When this is reached, the piston body 22 is urged into the closing position again. In this manner, a constant desired pressure will constantly be maintained in the first compartment by the pressure control means. Variations on such pressure control means are described in, inter alia, the above-cited U.S. Pat. No. 5,368,207, WO 00/35777 and FR 2690142.

With a pressure control device 17 according to the invention, the casing 20 and/or the piston body 22 are preferably manufactured from plastic. This is relatively light and easy to process. During use, there is the risk of pressure gas, in particular $CO_2$, migrating into the piston chamber 25, for instance through the casing 20, through the piston body 22 and/or along the gasket 23. As a result, the amount of gas in the piston chamber 25 will undesirably increase, so that pressure change will occur, as a result of which a different equilibrium situation will be set. The fact is that the piston body 22 will be moved away from the bottom 21, so that a greater pressure will be required at the opposite, second end 29 for moving the piston back into the same condition when an additional pressure gas has flowed into the piston chamber 25. Furthermore, there is the risk of the compressibility of the gas composition in the piston chamber 25 changing as a result thereof. In order to avoid these drawbacks, it has been suggested according to the invention to provide in the piston chamber 25 a scavenger 31 for capturing said pressure gas migrating into the piston chamber 25. Naturally, this scavenger is chosen such that it does capture the pressure gas, but not the gas introduced primarily into the piston chamber 25, in particular air or components thereof, in particular oxygen. When capturing the pressure gas, this scavenger 31 will not undergo any volume change relevant to the pressure in the piston chamber 25.

If $CO_2$ is used as pressure gas, the scavenger will preferably be selected from the group of $CO_2$ absorbing and/or adsorbing agents, for instance carbon, in particular activated carbon, diatomaceous earth (kieselguhr), clays, alumino silicates, zeolites or silicates. In principle, also liquids and solutions can be applied, in particular basic materials.

For other pressure gases, such as for instance nitrogen, suitable scavengers will be directly clear to the skilled person.

Preferably, excess pressure relief means (not shown) are provided in the first and second compartment, to which end generally known valves or the like may be used.

As shown in FIG. 1, filtering means 30 are provided in the second compartment 16 for filtering, from the gas flow, particles of the filler means 20, in particular relatively small activated carbon particles which could have an adverse effect on the quality of the product to be dispensed and, possibly, the health of the user. Moreover, blockages and damages are thus prevented. Such filtering means 30 can be designed in various manners, for instance gauze-shaped, foam-like, textile, semi-permeable polymers and the like. By positioning the filtering means 30 in the second compartment 16, contact between the fluid 3 to be dispensed and the filtering means 30 is prevented. Moreover, particles of the filler means 20 are prevented from ending up in the pressure control means 17. In fact, the filtering means 30 may also be provided in the passage openings 27. The filtering means 30 may, for instance, be disposed in the second compartment 16 prior to a closure thereof, for instance with the pressure control means 17.

A device according to FIG. 1 can be employed as follows.

A suitable amount of beer 3 is introduced in the first compartment 4, via the opening 6. Thereupon, the container 1 with the beer can be treated, for instance be pasteurized, for which a temporary seal may be placed in the opening 6. Then, the pressure control device 8, together with the dip tube 10 and the dispensing means 7 can be inserted into the container 2 via the opening 6, the dispensing means 7 being secured so as to close off the opening 6, for instance through sealing. During insertion of the pressure control device 8, the piston body 22 can be moved away from a closing position, in which the second end 29 sealingly abuts against the passage 19, for pressurizing the first compartment 1. Filling is preferably effected at an excess pressure such that the pressure in the first compartment 1 is at least equal to and preferably higher than the desired operating pressure in the head space of said first compartment 1. In a preferred embodiment described earlier, this means, for instance, that filling will take place at a minimum pressure of 1.65 bar, preferably somewhat higher. This ensures that the control device is kept in a closing position during filling, which prevents the premature escape of $CO_2$ from the second compartment. This also enables filling and fitting the second compartment already before the first compartment 1 filled. Further, the desired pressure will in each case be automatically obtained and maintained. If a consumer wants to remove beer from the first compartment, the diverting means 9 can be placed on the dispensing means 7, whereafter the passage 12 can be released simply by pressing on the knob 14 and the beer 3 is dispensed in a desired amount via the dip tube 10 and the duct 13. Upon release of the knob 14, the passage 12 is closed again as described earlier. When the first compartment 4 has been emptied completely, optionally the pressure control device 8 can be removed again for reuse or separate recycling. Placing the pressure control device can also be done by the user.

In an alternative embodiment, the dispensing means 7 with the diverting means 9, the dip tube 10 and the pressure control device 8 are designed as a unit which can be placed separately. Such a unit can for instance be supplied as a loose item and be made of refillable design.

FIG. 3 schematically shows a portion of an alternative embodiment of a pressure control device 8, with an alternative embodiment of pressure control means 17. In this embodiment, the pressure control means 8, at least the second compartment 16 is designed substantially as an aerosol container known per se. This comprises a metal wall 15 having at a topside an outlet opening 40 in which with the aid of a collar 41 a valve 32 is provided. This valve 32 is known per se as aerosol valve and comprises a housing 33 in which with the aid of a spring 34, a valve body 36 is pressed against a valve seat 38 for sealing a dispensing channel 27, formed in the embodiment shown by a part 27*a* extending in the valve body 36, a part 27*b* extending in the piston body 22 and a third part 27*c* extending in a dip tube 39 within the second compartment 16. When the valve body 36 is pressed from the valve seat 38, against the pressure of the spring 34, an open connection between the second compartment 16 and the space 43 within the casing 20 between the second end 29 of the piston body 22 and the collar 41 is formed. Between this space 43 and the first compartment 4 at least one passage opening 19 is provided for pressure equalization.

In this embodiment, the piston body 22 is pressed on the valve body 36 with the aid of a seat 44, while an open connection is formed between the channel parts 27*a* and 27*b*. The piston space 25 with the scavenger 31 therein is formed between the bottom 21 and the first end 24 of the piston body 22, at the side of the piston body 22 remote from the space 43. The casing 20 is attached on a flange 46 of the collar 41 with the aid of a snap edge 45, so that a fixed connection is obtained.

An embodiment of a pressure control device 8 according to FIG. 3 is further described in the international patent application WO/0035774. In this publication, also alternative embodiments for, in particular, pressure control means 17 are described which are understood to be incorporated herein by reference and can be provided with a scavenger 31 according to the invention.

In FIG. 4, a pressure control device 8 according to FIG. 3 is shown, with two alternative embodiments of scavengers 31*a*, 31*b* therein. In FIG. 3, the scavenger 31 is included in the piston space 25 in the form of a relatively solid element such as a compressed block of, for instance, powder or granules which is placed in the piston space 25 prior to placement of the piston body 25. The scavenger 31 may have been provided in the piston space 25 as a loose item but can also be attached to the wall, for instance by gluing, sealing, welding or any other suitable manner, including external attachment means such as screws and the like. In FIG. 4, two alternative possibilities are shown, which can be used separately from each other. In FIG. 4, on the left, a scavenger 31*a* is shown in the form of a pouch 47 holding the actual scavenger 31*a* in the form of, for instance, powder of granules 48. The pouch 47 may be manufactured from any suitable material as long as it is permeable to pressure gas. In FIG. 4, a second embodiment is shown, a scavenger 31*b*, in the form of a part directly connected to the bottom 21. In FIG. 4, the bottom 21 is shown as a separate insert which is attached in the casing 20 by, for instance, clamping, gluing, welding or a different method of attachment directly clear to the skilled person. The scavenger 31 may be formed by pressing, injection molding, cutting or the like from a scavenger-containing material, for instance a mixture of plastic and one of the above-mentioned possible scavenger materials. Alternatively, the scavenger 31*b* can be designed as a part of, for instance, the bottom wall 21, through a, for instance, two-layered design of the bottom wall, while the side of the bottom 21 that faces the piston space 25 is formed by said scavenger 31*b*.

It will be clear that the scavenger 31, 31*a*, 31*b* can also be provided in other manners and/or on other positions in the piston space 25, for instance on or as part of the piston body 22.

The present invention is not limited in any manner to the exemplary embodiments represented in the description and the drawing. Many variations thereon are possible within the framework of the invention.

For instance, the dispensing means and/or the diverting means can be designed differently, for instance as in known aerosols for obtaining foam. They may also be designed for single-time operation only, whereby the entire first compartment is emptied at one time. The container 2 can be manufactured in various manners and in different materials, for instance steel, aluminum or plastic. In the exemplary embodiments shown, the containers are of relatively high design, but it will be clear that a variety of dimensions can be utilized, for instance relatively flat, so that such a container can be stored relatively simply in a refrigerator or the like. Further, a variety of additional agents such as for instance cooling agents can be provided, depending on the application. In the exemplary embodiment shown, the propellant, in normal use, is introduced above the liquid level in the first compartment which prevents, to a large extent, a gas stream through the fluid to be dispensed. In particular, premature foaming is thereby prevented. It will be clear, however, that, if desired, also a different positioning of the pressure control device can be chosen, such that the propellant is led directly into the fluid to be dispensed. Thus, for instance an exact appropriate foaming can be obtained, for instance with so-called widgets, soft drinks such as milkshakes and the like.

These and many comparable variations are understood to fall within the framework of the invention.

The invention claimed is:

1. A pressure control device for medium-containing containers, which comprises a pressure control chamber with at least one movable wall part for operating a mechanism for opening and/or closing a gas supply opening of a gas holder, wherein in the pressure control chamber, a scavenger is included, wherein the pressure control chamber which contains the scavenger has at least one external wall, said external wall being effective so that gas pressure of at least 1.7 bar can be maintained inside the chamber, the scavenger being present in a sufficient amount to effectively scavenge gas which migrates from outside the chamber to inside the chamber.

2. A pressure control device according to claim 1, wherein the scavenger is designed for capturing at least $CO_2$ gas in the pressure control chamber.

3. A pressure control device according to claim 2, wherein the scavenger is a $CO_2$ scavenger.

4. A pressure control device according to claim 1, wherein the scavenger is selected from the collection of $CO_2$ absorbing and/or adsorbing agents.

5. A pressure control device according to claim 1, wherein the pressure control chamber is formed in a piston-cylinder assembly, the piston forming said movable wall part and the scavenger being fixedly connected to one of the walls of the pressure control chamber.

6. A pressure control device according to claim 1, wherein this is manufactured at least partly from plastic.

7. A container comprising a pressure control device according to claim 1 and a liquid and/or gas, wherein the pressure control device is accommodated at least partly in the liquid and/or the gas.

8. A container according to claim 7, wherein the liquid or the gas comprises at least $CO_2$.

9. A container according to claim 7, wherein the pressure control device comprises a gas holder in which a pressure gas is included at a first pressure while in the pressure control chamber, a second pressure prevails which is lower than the first pressure, said mechanism for opening and/or closing a gas supply opening of the gas holder being designed for having pressure gas escape in a controlled manner from the gas holder to the container to such an extent that the pressure in the container becomes approximately equal to or higher than the second pressure.

10. A container according to claim 9, wherein the pressure gas is, or at least comprises, $CO_2$ while the liquid is a carbonated beverage.

11. A method for preparing a beverage container, comprising the steps:
manufacturing a pressure control device according to claim 1;
manufacturing a beverage container;
introducing beverage and the pressure control device into the beverage container;
sealing the beverage container;
wherein
before the beverage and the pressure control device are brought into contact, the pressure control device is stored at atmospheric conditions.

12. A pressure control device according to claim 1, wherein said device is for a liquid or gas container.

13. A pressure control device according to claim 5, wherein the scavenger is fixedly connected to a fixed wall of the pressure control chamber.

14. A method for manufacturing a pressure control device, wherein a pressure control chamber with at least one movable wall part is manufactured, coupled to a valve assembly operable by said wall part for operating a mechanism for opening and/or closing a gas supply opening of a gas holder, wherein in the pressure control chamber a scavenger is provided, wherein the pressure control chamber which contains the scavenger has at least one external wall, said external wall being effective so that gas pressure of at least 1.7 bar can be maintained inside the chamber, the scavenger being present in a sufficient amount to effectively scavenge gas which migrates from outside the chamber to inside the chamber.

15. A pressure control device for medium-containing containers, which comprises a pressure control chamber with at least one movable wall part for operating a mechanism for opening and/or closing a gas supply opening of a gas holder, wherein a scavenger for capturing gas that migrates, during use, into the pressure control chamber is included in the pressure control chamber, wherein the pressure control chamber which contains the scavenger has at least one external wall, said external wall being effective so that gas pressure of at least 1.7 bar can be maintained inside the chamber, the scavenger being present in a sufficient amount to effectively scavenge gas which migrates from outside the chamber to inside the chamber.

16. A container comprising a pressure control device and a liquid and/or gas, the pressure control device being accommodated at least partly in the liquid and/or the gas, the pressure control device comprising a pressure control chamber with at least one movable wall part for operating a mechanism for opening and/or closing a gas supply opening of a gas holder, wherein in the pressure control chamber, a scavenger is included, wherein the pressure control chamber which contains the scavenger has at least one external wall, the scavenger being present in a sufficient amount to effectively scavenge gas which migrates from outside the chamber to inside the chamber.

* * * * *